United States Patent
Ji et al.

(10) Patent No.: US 12,423,472 B2
(45) Date of Patent: Sep. 23, 2025

(54) CAMERA WITH PRIVACY PROTECTION FUNCTION AND PRIVACY PROTECTION METHOD

(71) Applicant: ZHEJIANG UNIVERSITY, Zhejiang (CN)

(72) Inventors: Xiaoyu Ji, Zhejiang (CN); Wenjun Zhu, Zhejiang (CN); Wenyuan Xu, Zhejiang (CN); Yushi Cheng, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/579,843

(22) PCT Filed: Oct. 31, 2023

(86) PCT No.: PCT/CN2023/128008
§ 371 (c)(1),
(2) Date: Jan. 16, 2024

(87) PCT Pub. No.: WO2024/017418
PCT Pub. Date: Jan. 25, 2024

(65) Prior Publication Data
US 2025/0077703 A1 Mar. 6, 2025

(30) Foreign Application Priority Data
Mar. 3, 2023 (CN) .......................... 202310196870.X

(51) Int. Cl.
*G06F 21/62* (2013.01)
(52) U.S. Cl.
CPC ............................... *G06F 21/6245* (2013.01)

(58) Field of Classification Search
CPC ................................................... G06F 21/6245
See application file for complete search history.

(56) References Cited

U.S. PATENT DOCUMENTS

| | | | |
|---|---|---|---|
| 11,501,009 B1* | 11/2022 | Yang | G06F 21/62 |
| 2013/0340086 A1* | 12/2013 | Blom | G06F 21/6245 726/26 |
| 2015/0150140 A1* | 5/2015 | Biswas | G06F 1/1652 726/26 |
| 2016/0114247 A1* | 4/2016 | Biswas | A63F 13/216 463/43 |
| 2023/0023083 A1* | 1/2023 | Shelton, IV | H04L 67/52 |

\* cited by examiner

*Primary Examiner* — Frantz B Jean
(74) *Attorney, Agent, or Firm* — Fredrikson & Byron, P.A.

(57) ABSTRACT

A camera with a privacy protection function and a camera privacy protection method therefor are provided, which relates to the field of image privacy protection. The camera includes an image acquisition module, a parameter storage module, an access control module, and an image post-processing module. An objective of the privacy protection method of the camera is to enable an image shot by the camera to naturally have a privacy protection capability to resist sniffing of a malicious third party to personal privacy, which includes, but is not limited to, face recognition. A system deeply participates in a generation process of an image from a plurality of levels, which can affect various procedures including image signal processing, image color adjustment, and an image encoding process, and provide a platform for the development and application of underlying privacy protection algorithms.

7 Claims, 3 Drawing Sheets

CAMERA WITH PRIVACY PROTECTION FUNCTION AND PRIVACY PROTECTION METHOD

CROSS-REFERENCE TO RELATED APPLICATION

This patent application is a national stage of International Application No. PCT/CN2023/128008, filed on Oct. 31, 2023, which claims the benefit and priority of Chinese Patent Application No. 202310196870.X filed with the China National Intellectual Property Administration on Mar. 3, 2023 and entitled "CAMERA WITH PRIVACY PROTECTION FUNCTION AND PRIVACY PROTECTION METHOD THEREFOR". Both of the aforementioned applications are incorporated by reference herein in their entireties as part of the present application.

TECHNICAL FIELD

The present disclosure relates to the field of image privacy protection, and in particular, to a camera with a privacy protection function and a privacy protection method therefor.

BACKGROUND

With widespread application of intelligent technologies such as image recognition, cameras are used almost everywhere. Application fields include video surveillance, health monitoring, autonomous driving, human-computer interaction, and the like. For example, there were over 1 billion monitoring cameras in 2021 all over the world, and the market size is expected to reach 57.9 billion dollars by 2024. Although image intelligence applications have brought a convenient life experience to people, the privacy information in images shot by cameras may be used by malicious third parties for criminal purposes, which causes concerns about camera privacy infringement.

Most existing methods require transferring images with sensitive privacy information from the cameras to software layers for desensitization processing. However, raw images may be leaked in various links of a data transmission chain, and pure software layer processing is easily skipped by malicious programs. Therefore, how to protect image privacy more reliably is an urgent technical problem desired to be solved in industry.

SUMMARY

The present disclosure provides a camera with a privacy protection function and a privacy protection method therefor. A system deeply participates in a generation process of an image from a plurality of aspects, which can affect various procedures including image signal processing, image color adjustment and an image encoding process, and provides a platform for the application and development of underlying privacy protection algorithms.

The present disclosure is implemented by using the following technical solutions:

A camera with a privacy protection function includes:

an image acquisition module, including a lens, a Complementary Metal Oxide Semiconductor (CMOS) image sensor, and an Image Signal Processor (ISP), and configured to perform image shooting, where privacy protection within the image acquisition module is implemented by adjusting adjustable parameters in the ISP;

a parameter storage module, including a Read-Only Memory (ROM), and configured to store a privacy protection algorithm and privacy protection parameters, where the privacy protection algorithm and the privacy protection parameters are obtained through computer simulation experiments; the ROM in the parameter storage module is not allowed to be modified by a user after data programming is completed; and content in the ROM cannot be modified, and is only readable for internal components inside the camera;

an access control module, including a Micro-Controller Unit (MCU), and configured to read the privacy protection parameters from the parameter storage module and send a shooting instruction to the image acquisition module, where the access control module shields access of an external device to any registers, memories, and storages inside the camera; only the access control module can communicate with the external device, and is only limited to interaction of shooting related instruction and transmission of image data; the external device cannot acquire image data that is output by the internal CMOS image sensor or that has not been subjected to complete privacy protection; and an image post-processing module, including a Digital Signal Processor (DSP) or other efficient image data processors (for example, a Graphics Processing Unit (GPU) or a Neural-Network Processing Unit (NPU)), and configured to execute the privacy protection algorithm to process a shot image, which is then transmitted to the access control module, and finally, transmitted to the external device.

The camera only transmits the image data that has been subjected to the privacy protection processing to the external device. The image data here refers to a single image or a video stream consisting of a plurality of images. The image data is encoded in a general image/video format. The plurality of privacy protection algorithms configured into of a single module or a multi-module combination are able to be simultaneously run in the camera.

The present disclosure provides a camera privacy protection method. The method is implemented based on the camera with a privacy protection function, which specifically includes the following steps:

1) The external device may transmit a one-time shooting request to the access control module through an I²C (Inter-Integrated Circuit) or other communication interfaces. The shooting request of the external device may include a series of parameters, including shooting mode selection, image pixel resolution, and image shooting frame rate, and parameters related to privacy protection are not allowed to be set.

2) After receiving the shooting request, the access control module may read the privacy protection parameters from the parameter storage module. The privacy protection parameters may include an existing ISP module parameter in the image acquisition module and a DSP processing algorithm parameter of the image post-processing module. The above parameters are pre-solved through a privacy protection algorithm. The access control module may set the ISP parameter in the image acquisition module and the DSP parameter of the image post-processing module through an internal bus. The access control module may enable, and send a shooting instruction to the image acquisition module.

3) After receiving the shooting instruction from the access control module, the image acquisition module may perform one-time image shooting to generate an image (a picture/video) corresponding to the shooting instruction, and transmit an image data stream to the image post-processing module through a bus.

4) The image post-processing module may perform the privacy protection processing on the received video/picture, which may include pixel value changing at a pixel level, frequency domain processing at an image level, and spatiotemporal domain comprehensive processing at a video level, then performs Joint Photographic Experts Group (JPEG) encoding and compressing, and transmits the video/picture to the access control module; and finally, the access control module transmits an image data stream to the external device through a Mobile Industry Processor Interface Camera Serial Interface (MIPI CSI) or other image transmission interfaces. The privacy protection algorithm executed by the image post-processing module has the characteristics of small additional calculation amount, short time consumption, and low latency, and does not affect normal use of the external device.

The present disclosure has the following beneficial effects:

(1) The present disclosure participates in a generation process of the image from a plurality of levels, and provides a platform for the development and application of underlying privacy protection algorithms.

(2) The present disclosure affects the shooting of the image from a hardware level, and can deploy a plurality of privacy protection algorithms, for example, an ISP privacy parameter, a digital adversarial example, and an image frequency domain watermark, which has wide applicability.

(3) The present disclosure programs the privacy protection parameters into the ROM, so that the privacy protection parameters cannot be modified by the external device; and a raw image cannot be acquired even if an external system is manipulated by a malicious third party, so the security is high.

(4) The present disclosure can directly replace an insecure camera in a video application system as a complete module, which has strong practicability.

DETAILED DESCRIPTION OF THE EMBODIMENTS

In order to facilitate understanding and implementing the present disclosure by those skilled in the art, the present disclosure will be further described in detail below with reference to drawings and embodiments. It is to be understood that, the example embodiment described here is only used for describing and explaining the present disclosure, and is not used for limiting the present disclosure.

Figure 1:
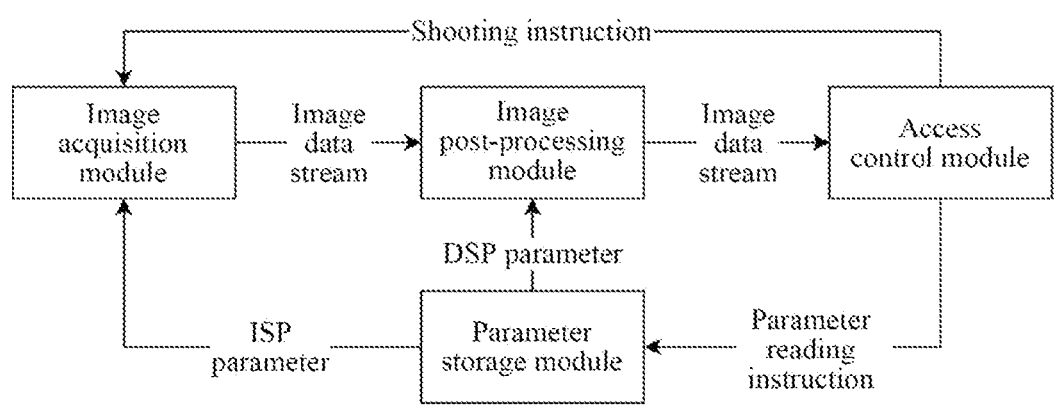
FIG. 1 is a schematic diagram of compositions of a camera according to an example embodiment of the present disclosure.

The present disclosure provides a camera with a privacy protection function and a privacy protection method therefor. FIG. 1 shows a schematic diagram of compositions of a camera according to the present example embodiment. As shown in FIG. 1, the camera with a privacy protection function includes four modules, namely an image acquisition module, a parameter storage module, an access control module and an image post-processing module. In some embodiments, the camera consists of the four modules.

1) The image acquisition module includes a lens, a CMOS image sensor, and an ISP. In some embodiments, the image acquisition module consists of the lens, the CMOS image sensor, and an ISP. Where privacy protection within the image acquisition module is implemented by adjusting adjustable parameters in the ISP;

2) The parameter storage module includes a ROM, and in some embodiments consists of the ROM. The parameter storage module is configured to store a privacy protection algorithm, which for example is the algorithm to add adversarial noises and frequency domain watermarks, and privacy protection parameters, where the ROM in the parameter storage module is not allowed to be modified by a user after data programming is completed.

3) The access control module includes an MCU, and in some embodiments, consists of the MCU. The access control module is configured to read the privacy protection parameters from the parameter storage module and sends a shooting instruction to the image acquisition module. Only the access control module can communicate with the external device, and is only limited to interaction of shooting related instruction and transmission of image data.

4) The image post-processing module includes a DSP or other efficient image data processors (for example, a GPU and an NPU), and in some embodiments, consists of the DSP or other efficient image data processors. The image post-processing module is configured to execute the privacy protection algorithm to perform privacy protection on the image.

Figure 2:
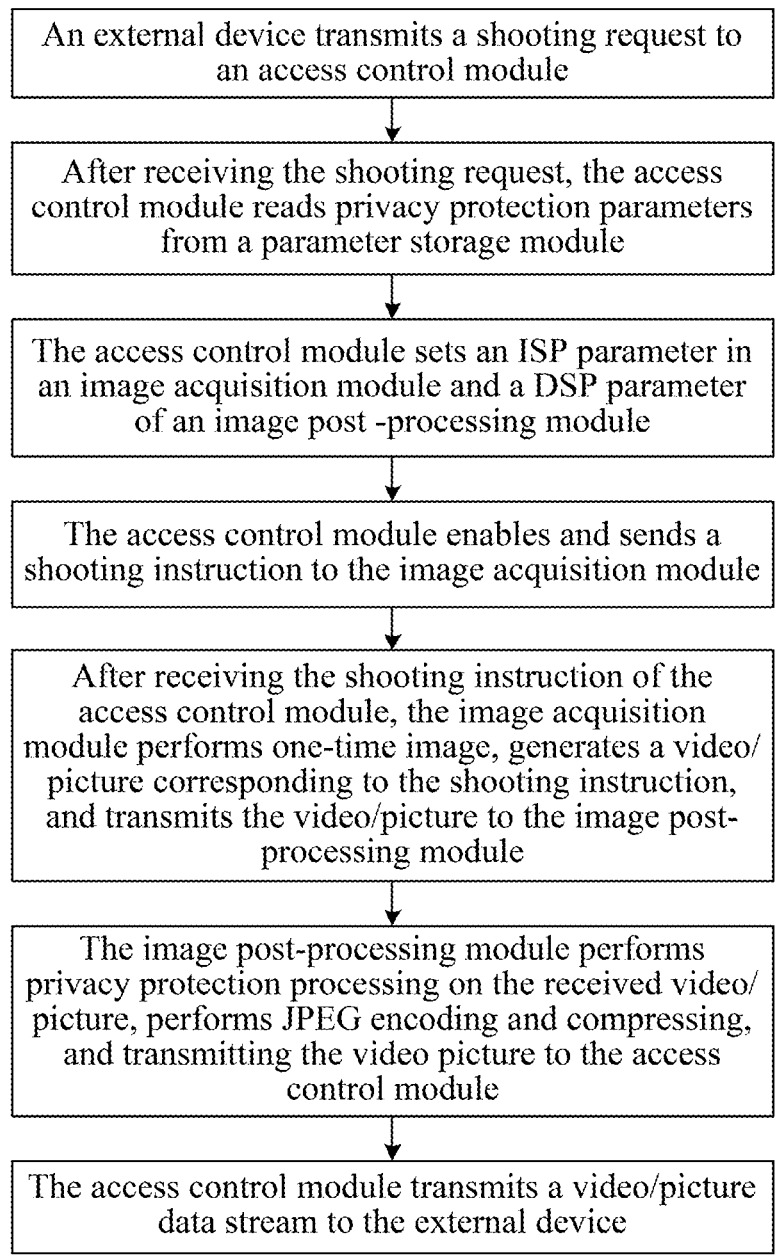
FIG. 2 is a flowchart of a privacy protection method for the camera according to the example embodiment of the present disclosure.

FIG. 2 shows a flowchart of a privacy protection method for a camera according to an example embodiment of the present disclosure. As shown in FIG. 2, a flowchart of shooting an image by a camera apparatus with a privacy protection function includes the following steps 1) to 4):

In step 1), a one-time shooting request is transmitted from the external device to the access control module of a system through an I²C or other communication interfaces. The shooting request of the external device includes a series of parameters, including shooting mode selection, image pixel size, and image shooting frame rate, and privacy protection related parameters are not allowed to be set.

In step 2), after receiving the shooting request, the access control module reads the privacy protection parameters from the parameter storage module. The privacy protection related parameters include an existing ISP module parameter in the image acquisition module and a DSP processing algorithm parameter of the image post-processing module. The existing ISP module parameter includes, for example, black level, lens shadow matrix, strength of image denoising, gamma curve, color correction matrix and so on; and the DSP processing algorithm parameter includes, for example, predefined adversarial noises and frequency domain watermarks. The above parameters are pre-solved through a privacy protection algorithm. The ISP parameter in the image acquisition module and the DSP parameter of the image post-processing module are set through an internal bus by the access control module. The access control module enables and sends a shooting instruction to the image acquisition module.

In step 3), after receiving the shooting instruction from the access control module, the image acquisition module performs one-time image shooting to generate an image (a picture/video) corresponding to the shooting instruction. And, an image data stream is transmitted to the image post-processing module through a bus.

In step 4), privacy protection processing is performed on the received video/picture by the image post-processing module. The privacy protection processing may include pixel value changing at a pixel level, frequency domain processing at an image level, and spatiotemporal domain comprehensive processing at a video level. Then, the video/picture is subjected to Joint Photographic Experts Group (JPEG) encoding and compressing, and transmitted to the access control module. Finally, an image data stream is transmitted from the access control module to the external device through a Mobile Industry Processor Interface Camera Serial Interface (MIPI CSI) or other image transmission interfaces. The privacy protection algorithm executed by the image post-processing module has the characteristics of small additional calculation amount, short time consumption, and low latency, and does not affect normal use of the external device.

Figure 3:
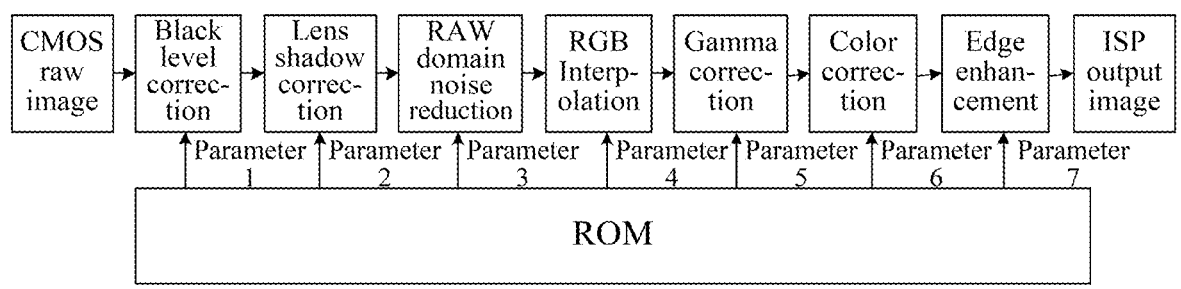
FIG. 3 is a schematic diagram of ISP privacy protection parameters according to an example embodiment of the present disclosure.

FIG. 3 shows a schematic diagram of ISP privacy protection parameters in the image acquisition module. As shown in FIG. 3, an input of the ISP is a raw image output by the CMOS image sensor, and its output is a result image after being subjected to a series of processing. There is a series of cascaded image processing processes in the ISP, including black level correction, lens shading correction, RAW domain noise reduction, Red-Green-Blue (RGB) interpolation, Gamma correction, color correction, and edge enhancement. There are adjustable parameters in the image processing processes in the ISP for controlling key attributes such as degree, directions, and types. An objective of privacy protection can be partially achieved by properly adjusting these ISP adjustable parameters. Specific values of these adjustable parameters are obtained by an optimization algorithm for different privacy protection objects, and are written into the ROM of the parameter storage module. The optimization algorithm is for example the gradient descent algorithm, the genetic algorithm, the particle swarm optimization algorithm, or the random forest algorithm. The privacy protection parameters are directly set into the ISP by using a Direct Memory Access (DMA) channel in the MCU.

Figure 4:
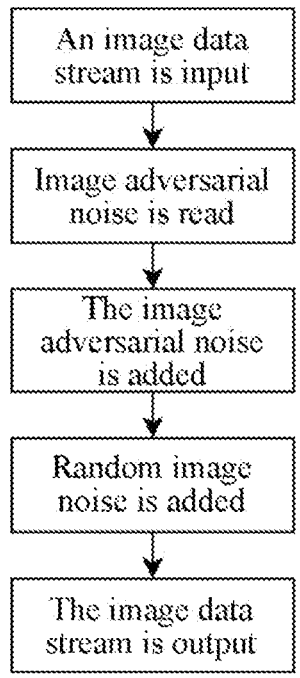
FIG. 4 is a flowchart of an adversarial noise adding process for privacy protection according to an example embodiment of the present disclosure.

FIG. 4 shows a flowchart of an adversarial noise adding process for privacy protection of a DSP in an image post-processing module. As shown in FIG. 4, image adversarial noise, which is obtained by an optimization algorithm for different privacy protection objects and has certain universality, is read from the ROM by the DSP first. The optimization algorithm is for example the fast gradient sign method, the projected gradient descent, the momentum-iterative fast gradient sign method or so on. Then, adversarial noise is superimposed on an input image data stream, so that the image data is difficult to be recognized by an AI algorithm. Finally, random image noise is superimposed on the image for confusing with the adversarial noise, and the image data stream is output.

Figure 5:
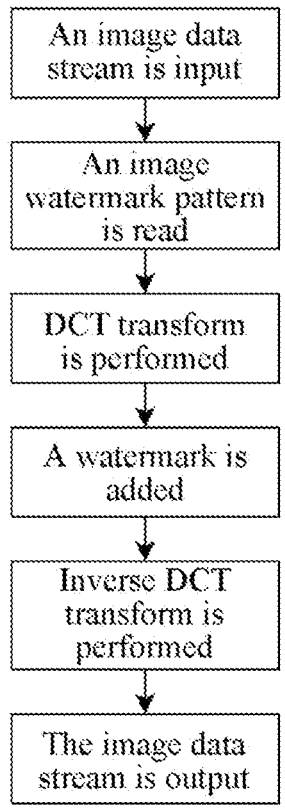
FIG. 5 is a flowchart of a frequency domain watermark process for privacy protection according to an example embodiment of the present disclosure.

FIG. 5 shows a flowchart of a frequency domain watermark process for privacy protection of a DSP in an image post-processing module. As shown in FIG. 5, an image watermark pattern, which is embedded with a device identifier for sourcing work after privacy leakage, is read from the ROM by the DSP first. Then, an input image data stream is converted into a frequency domain through Discrete Cosine Transform (DCT). Next, the water pattern is added to a high-frequency part of the image frequency domain, a frequency domain image added with a watermark is converted to an image domain through inverse DCT, and the image data stream is output.

It is to be understood that parts not described in detail in this specification all belong to the prior art.

It is to be understood that the above description for embodiments is relatively described in detail and cannot be considered as a limitation to the scope of protection of the present disclosure patent. Under the inspiration of the present disclosure, those of ordinary skill in the art can also make substitutions or modifications without departing from the scope of protection of the claims of the present disclosure, all of which fall within the scope of protection of the present disclosure. The scope of protection requested by the present disclosure is subject to the attached claims.

What is claimed is:

1. A camera with a privacy protection function, comprising:
    an image acquisition module, comprising a lens, a Complementary Metal Oxide Semiconductor (CMOS) image sensor, and an Image Signal Processor (ISP), and configured to perform image shooting;
    a parameter storage module, comprising a Read-Only Memory (ROM), and configured to store a privacy protection algorithm and privacy protection parameters;
    an access control module, comprising a Micro-Controller Unit (MCU), and configured to read the privacy protection parameters from the parameter storage module and send a shooting instruction to the image acquisition module, wherein the access control module shields access of an external device to any registers, memories, and storages inside the camera; and
    an image post-processing module, comprising a Digital Signal Processor (DSP), a Graphics Processing Unit (GPU) or a Neural-Network Processing Unit (NPU), and configured to execute the privacy protection algorithm to perform privacy protection processing on a shot image, which is then transmitted to the access control module, and finally, transmitted to the external device,
    wherein the camera only transmits image data that has been subjected to the privacy protection processing to the external device, and the privacy protection algorithm configured into a plurality of single modules or a multi-module combination is able to be simultaneously run in the camera.

2. A camera privacy protection method, implemented based on the camera with a privacy protection function according to claim 1, and specifically comprising following steps:
    1) transmitting, by the external device, a one-time shooting request to the access control module;
    2) after receiving the shooting request, reading, by the access control module, the privacy protection parameters from the parameter storage module; setting, by the access control module, an ISP parameter in the image acquisition module and a DSP parameter of the image post-processing module; and enabling and sending, by the access control module, the shooting instruction to the image acquisition module;

3) after receiving the shooting instruction from the access control module, performing, by the image acquisition module, one-time image shooting, generating a video/picture corresponding to the shooting instruction, and transmitting the video/picture to the image post-processing module; and 4) performing, by the image post-processing module, the privacy protection processing on the received video/picture, performing Joint Photographic Experts Group (JPEG) encoding and compressing, and transmitting the video/picture to the access control module; and finally, transmitting, by the access control module, a video/picture data stream to the external device.

3. The camera privacy protection method according to claim 2, wherein the shooting request of the external device does not comprise a parameter related to privacy protection.

4. The camera privacy protection method according to claim 2, wherein the privacy protection parameters are pre-solved through the privacy protection algorithm, and comprises an existing ISP module parameter in the image acquisition module and a DSP processing algorithm parameter of the image post-processing module.

5. The camera privacy protection method according to claim 2, wherein desensitization processing of the image post-processing module comprises pixel value changing at a pixel level, frequency domain processing at an image level, and spatiotemporal domain comprehensive processing at a video level.

6. The camera privacy protection method according to claim 2, wherein only the access control module is able to communicate with the external device, and is only limited to interaction of shooting related instruction and transmission of image data.

7. The camera privacy protection method according to claim 2, wherein the privacy protection parameters are obtained through a computer simulation experiment, is only readable by internal modules of the camera, and is not modified.

* * * * *